US008475969B2

(12) United States Patent
Eickhoff

(10) Patent No.: US 8,475,969 B2
(45) Date of Patent: Jul. 2, 2013

(54) HIGH POWER DENSITY, ULTRA-LIGHT POWER GENERATOR

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1933 days.

(21) Appl. No.: 11/340,978

(22) Filed: Jan. 27, 2006

(65) Prior Publication Data

US 2007/0120522 A1  May 31, 2007

Related U.S. Application Data

(63) Continuation-in-part of application No. 11/257,738, filed on Oct. 25, 2005, now Pat. No. 7,811,690, and a continuation-in-part of application No. 11/270,848, filed on Nov. 9, 2005, now Pat. No. 7,901,816.

(51) Int. Cl.
    *H01M 8/10* (2006.01)
(52) U.S. Cl.
    USPC ........... 429/490; 429/402; 429/405; 429/462; 429/466; 429/483; 429/485; 429/522
(58) Field of Classification Search
    USPC ................ 429/27, 28, 30, 31, 402, 405, 462, 429/466, 476, 483, 485, 490, 522
    See application file for complete search history.

(56) References Cited

U.S. PATENT DOCUMENTS

| 6,127,058 | A | 10/2000 | Pratt | |
|---|---|---|---|---|
| 2002/0086197 | A1 | 7/2002 | Breuer | |
| 2002/0106541 | A1 | 8/2002 | Yamada | |
| 2005/0069740 | A1* | 3/2005 | Ulmer et al. | 429/24 |
| 2005/0142410 | A1 | 6/2005 | Higashi et al. | 429/30 |
| 2005/0181245 | A1 | 8/2005 | Bonne et al. | 429/12 |
| 2006/0051627 | A1* | 3/2006 | Jiang et al. | 429/13 |

FOREIGN PATENT DOCUMENTS

| JP | 2005-310583 | * 11/2005 |
|---|---|---|
| JP | 2005-310583 | 4/2009 |
| WO | WO 02/30810 | 4/2002 |
| WO | WO 2005/008824 | 1/2005 |

OTHER PUBLICATIONS

PCT International Search Report from corresponding PCT application, published Jul. 4, 2007.
First Office Action for Chinese Patent Application No. 200780002973.7 Issued Aug. 21, 2009 (7 pages).
First Office Action Translation for Chinese Patent Application No. 200780002973.7 (8 pages).

* cited by examiner

*Primary Examiner* — Patrick Ryan
*Assistant Examiner* — Ben Lewis
(74) *Attorney, Agent, or Firm* — Schwegman, Lundberg & Woessner, P.A.

(57) ABSTRACT

High power density generators are formed with a flexible multi-layered structure. The structure includes a fuel layer with a separate fuel cell stack adjacent to each side of the fuel layer. The structure can be flexible and formed into a variety of shapes.

24 Claims, 2 Drawing Sheets

HIGH POWER DENSITY, ULTRA-LIGHT POWER GENERATOR

CROSS REFERENCE TO RELATED APPLICATION

This is a continuation-in-part of U.S. patent application Ser. No. 11/257,738 filed Oct. 25, 2005 now U.S. Pat. No. 7,811,690 entitled "Proton Exchange Membrane Fuel Cell" and U.S. patent application Ser. No. 11/270,848 filed Nov. 9, 2005 now U.S. Pat. No. 7,901,816 entitled "Water Reclamation In A Micropower Generator".

FIELD

The invention pertains to solid state electrical generators. More particularly, the invention pertains to multi-layer, high power density generators.

BACKGROUND

One type of known fuel cell incorporates a proton exchange membrane in combination with electrodes located on each side of the membrane, along with various gas diffusion layers and associated hydrophobic and hydrophilic coatings. One form of such a power generator has been disclosed in U.S. Patent Application entitled "Proton Exchange Membrane Fuel Cell", application Ser. No. 11/257,738, filed Oct. 25, 2005, assigned to the Assignee hereof. The disclosure of that applicant is hereby incorporated by reference. Another form of a power generator which incorporates a multi-layer fuel cell produces electricity and water as a by-product. The water can be reclaimed and used to produce additional hydrogen gas through a reaction with a solid hydrogen producing fuel. Such a power generator and fuel cell are disclosed in U.S. Patent Application entitled "Water Reclamation in a Micropower Generator", application Ser. No. 11/270,848, filed Nov. 9, 2005. That application is assigned to the Assignee hereof and incorporated herein by reference.

While known solid state power generators are useful and appropriate for their intended purpose, there continue to be outstanding unmet needs for higher power density generators, as opposed to energy density, than have heretofore been available. There continues to be a need for high power density solid generators which are suitable for micro- or nano-applications. Preferably such power generators would be light weigh, relatively inexpensive, valveless and would exhibit sufficient power for high power, light weight applications.

DETAILED DESCRIPTION

Figure 1:
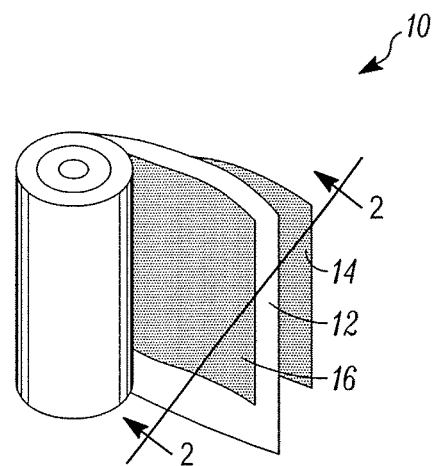
FIG. 1 is an isometric type view of a power generator in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Power generators in accordance with the invention exhibit higher power density without a need for either an onboard source of water or valves to regulate the hydrogen generating chemical reaction. In one aspect of the invention a rectangular shaped generator can be formed almost entirely of fuel cell stacks with a thin layer of fuel between the stacks. Such a power generator can be expected to have a very high power density (in excess of 10 watts/liter) in view of the large fuel cell area.

The above described power generators could be implemented with a plurality of flexible layers and could be used flat, for example as wing of an ultra-light air vehicle or rolled into a cylindrical configuration. In yet another aspect of the invention, such generators can be expected to be inherently light in weight as a result of the high specific energy of fuel and capable, when configured appropriately, of producing power levels which could be used to energize ultra-light air vehicles.

In yet another aspect of the invention a three-layer power generator incorporates a relatively thin flexible sheet, a fuel layer such as lithium aluminum hydride or other chemical hydride which can generate oxygen when exposed to water vapor. The fuel layer in a disclosed embodiment is sandwiched between two fuel cell stacks. Each of the stacks incorporates at least one proton exchange membrane, gas diffusion layers, electrodes and associated hydrophobic and hydrophilic coatings as would be understood by those of skill in the art. The composite power generator is flexible and can be formed into a planar, substantially cylindrical or other shapes as required for a particular application.

In yet another aspect of the invention, the multi-layer power generator recycles water generated by the electrochemical reactions in the associated fuel cells and uses the water to generate hydrogen thereby obviating any need for onboard source of water. Further, the reactions regulate themselves and thus require no regulating valves.

Power generators in accordance with the invention can be implemented in an array with a common fuel layer. Members of a plurality of fuel cells formed on each side of the fuel layer can be interconnected in series to increase output voltage. Multiple stacks can be interconnected in parallel, in cylindrical or planar form, to achieve increased output power.

In yet another aspect of the invention, the oxygen flow needed to generate the high power densities, where the stacks are closely arranged, can be achieved by forcing ambient atmosphere through the stacks. This can be accomplished in an aircraft for example by passing air flow generated by a rotor or wings past the stacks. In other applications the same effect can be achieved using a fan or a pump.

FIG. 1 illustrates a high power density, ultra-light power generator 10 in accordance with the invention. The generator 10 incorporates a fuel layer 12 such as for example lithium aluminum hydride or other chemical hydride which produces hydrogen when exposed to water vapor. The fuel layer 12 which could be elongated and have a rectangular shape generally as indicated in FIG. 1 has associated therewith fuel cell stacks 14 and 16, one of each side thereof. It will be understood that all of the layers 12, 14 and 16 of the generator 16 are flexible and can be formed into a planar, substantially planar, curved, such as cylindrical, configuration all without limitation.

Those of skill will also understand that the layers 12-16 of the generator 10, while indicated generally in a rectangular form in FIG. 1 are not limited to any particular shape. The generator 10 can assume a variety of physical configurations all without limitation and without departing from the spirit and scope of the invention.

Figure 2:
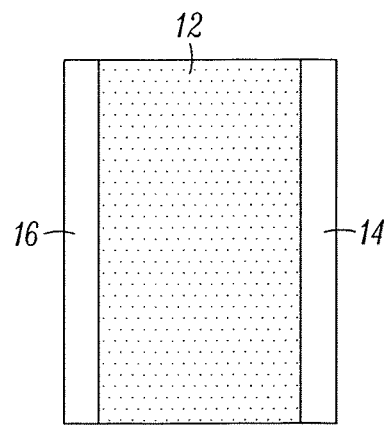
FIG. 2 is a sectional view taken along plane 2-2 of FIG. 1.

FIG. 2 is a sectional view taken along plane 2-2 of FIG. 1. FIG. 2 illustrates the relationship between the various layers of the generator 10.

Each of the fuel cell stacks 14, 16 incorporates a multi-layer planar fuel cell having an anode, cathode, a proton exchange membrane and other layers as would be understood by those of skill in the art which are useful or desirable in implementing such fuel cell stacks. One of the advantages of fuel generator such as the generator 10 results from the fact that the fuel cell stacks 14, 16 can be formed with a large area. This can produce a very high power density for a limited amount of time depending on the amount of fuel available.

Figure 3:
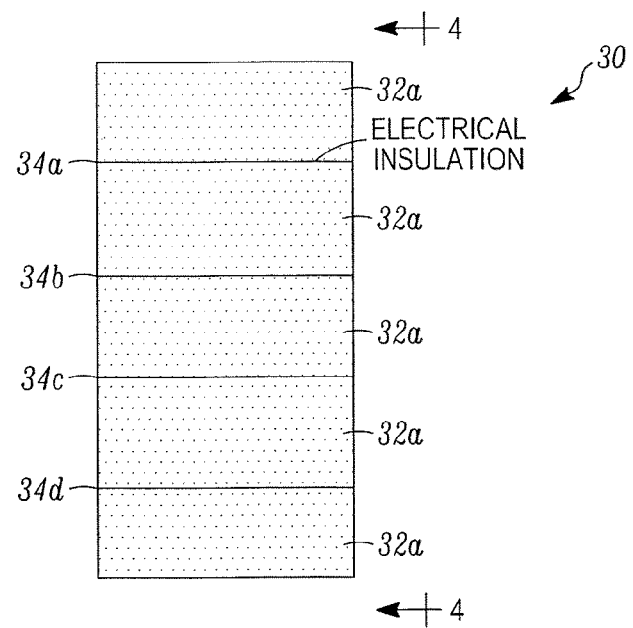
FIG. 3 is a view of a power generator in accordance with the invention which incorporates an array of fuel cells.
Figure 4:
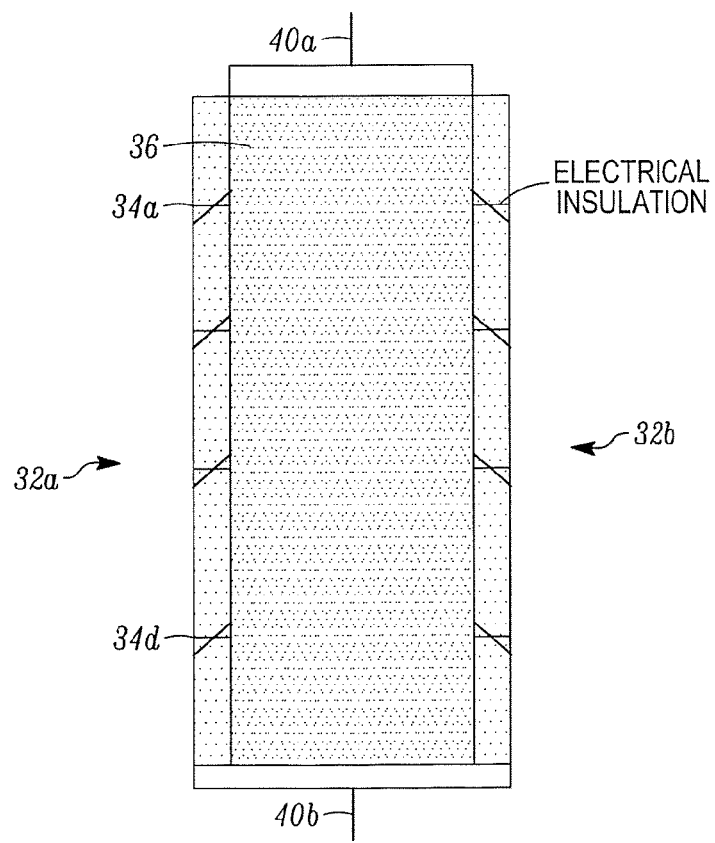
FIG. 4 is a view of the generator of FIG. 3 taken along the plane 4-4.

FIGS. 3 and 4 taken together illustrate one particular form of a generator 30 in accordance with the invention. Generator 30 incorporates a series connected array of fuel cells 32a formed on one side of a fuel layer 36 and a second plurality of fuel cells 32b formed on the other side of the fuel layer 36. Each of the members of the plurality 32a and the plurality 32b can be interconnected in series to generate a higher output voltage between connections 40a, b than could be easily achieved with a single fuel cell.

It will be understood that the fuel cells of the array 30 are spaced apart from one another by intervening layers of insulation 34a, b, c and d. It will also be understood that the number of fuel cells present in the array 30 is not a limitation of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A power generator comprising:
at least one multi-layer structure having a flexible layer of solid fuel, the layer having first and second spaced apart sides and a thickness substantially less than one of a length or a width thereof and wherein the solid fuel of the flexible layer is substantially continuous between opposing spaced apart sides and across the thickness; and
first and second flexible fuel cell layers, positioned on respective sides of and in direct contact with the opposing respective sides of the fuel layer, the fuel cell layers each having a thickness parameter substantially less than one of an electrode length, or an electrode width thereof, the structure having a fuel cell area that generates electrical energy with a power density in excess of 10 watts/liter.

2. A generator as in claim 1 where the structure is elongated and is rollable into a substantially cylindrical shape.

3. A generator as in claim 1 which includes a plurality of substantially identical multi-layer structures, the structures are one of series or parallel connected.

4. A generator as in claim 3 where the series connected plurality has a power density in excess of 10 watts/liter, and the parallel connected plurality has a power density in excess of 10 watts/liter.

5. A generator as in claim 4 configured as to be substantially cylindrical with first and second electrodes couplable to an external load.

6. A generator as in claim 1 where at least some of the fuel cell layers each include an anode and a cathode spaced apart by a solid flexible electrolyte.

7. A generator as in claim 6 where selected members of the fuel cell layers are electrically isolated from one another and interconnected in one of series or parallel.

8. A generator as in claim 1 where the structure is configured as one of planar or cylindrical.

9. A generator as in claim 8 where selected members of the fuel cell layers are electrically isolated from one anther and interconnected in one of series or parallel.

10. A generator as in claim 9 wherein water produced therein is recycled to produce additional hydrogen.

11. A power generator comprising:
at least one multi-layer fuel cell, the fuel cell incorporating an anode and a cathode spaced apart at least by a solid electrolyte;
and a layer of solid fuel positioned adjacent to the multi-layer fuel cell with the combined multi-layer fuel cell and fuel layer having a fuel cell area that generates electrical energy with a power density in excess of 10 watts/liter wherein the solid fuel of the layer is substantially continuous in length, width and thickness and wherein the anode and cathode are in direct contact with opposing sides of the layer of solid fuel.

12. A generator as in claim 11 which includes at least a second multi-layer fuel cell located at one of, adjacent to the at least one fuel cell with the fuel layer having as surface common to both fuel cells, or, displaced from the at least one fuel cell with the fuel layer therebetween.

13. A generator as in claim 12 where the fuel cells and fuel layer are configured to use water generated by electrochemical reactions carried out by the fuel cells to generate hydrogen for use in subsequent reactions.

14. A generator as in claim 13 where the hydrogen generating reactions are self-regulating with the fuel cells and fuel layer generating electrical energy in the absence of regulating valves.

15. A generator as in claim 14 where the combined fuel cells and fuel layer are flexible.

16. A generator as in claim 14 where the cells and fuel layer each have respective length, width and thickness parameters where a composite thickness parameter of fuel cell and fuel layer thicknesses is substantially less than the respective length and width parameters thereby enhancing the power density.

17. A generator as in claim 14 where the fuel cells and fuel layer are flexible and deformable into selected shapes.

18. A generator as in claim 17 where the fuel cells are configured so as to be exposed to ambient atmosphere and oxygen therein thereby enhancing the power density.

19. A generator as in claim 17 which includes first and second pluralities of fuel cells spaced apart by the fuel layer.

20. A generator as in claim 19 where the fuel cells are interconnected in at least one of a parallel array or a series array.

21. A method comprising:
providing a flexible layer of solid fuel, the solid fuel of the flexible layer being substantially continuous in length, width and thickness;
providing flexible first and second layers of fuel cells;
interconnecting the respective cells in accordance with a predetermined configuration; and
positioning the layers of cells with the fuel layer therebetween with each of the layers of cells in direct contact with the fuel layer thereby &timing a multi layer electrical generator.

22. A method as in claim 21 which includes fondling the electrical generator into a predetermined shape.

23. A method as in claim 22 which includes exposing respective ones of the fuel cells to oxygen.

24. A method as in claim 23 including initiating electrochemical reactions in the multi-layer generator thereby generating an electrical current with a power density in excess of 10 watts/liter.

* * * * *